United States Patent [19]
Zimmermann

[11] 3,759,013
[45] Sept. 18, 1973

[54] CLOSURE APPARATUS

[76] Inventor: Guenter Zimmermann, 600 Casler Ave., Clearwater, Fla.

[22] Filed: Dec. 13, 1971

[21] Appl. No.: 207,126

[52] U.S. Cl............ 53/329, 53/373, 156/583
[51] Int. Cl.............................. B65b 7/28
[58] Field of Search............ 53/329, 373; 156/583

[56] References Cited
UNITED STATES PATENTS

| | | | |
|---|---|---|---|
| 3,372,081 | 3/1968 | Hurschman | 156/583 |
| 3,102,182 | 8/1963 | Oelze et al. | 53/373 X |

*Primary Examiner*—Travis S. McGehee
*Attorney*—Stein et al.

[57] ABSTRACT

A method and apparatus for sealing aluminum containers comprising a plurality of annular cup retaining inserts mounted in rows and columns on a conveyor-like platform, each insert having a resilient sealing ring with substantially L-shaped cross-section fixedly attached to its upper surface and extending vertically downward along the internal vertical wall of the insert. A row of heat sealing heads, each having a horizontally disposed heat sealing face located at its lower extreme, is located above the conveyor-like platform, and each heat sealing head is concentrically aligned with and immediately above a correspondingly positioned container and insert at the sealing station. The sealing process comprises compressing a lid placed over the opening of the container and the upper surface of the rim of the container between the heat sealing face and the sealing ring whereby the lid and container are uniformaly sealed together to effectively isolate the contents of the container from the surrounding environment.

5 Claims, 4 Drawing Figures

PATENTED SEP 18 1973 3,759,013

INVENTOR.
GUENTER ZIMMERMANN
BY Law Offices of
Stein & Orman
ATTORNEYS.

CLOSURE APPARATUS

BACKGROUND OF THE INVENTION

1. Field of the Invention

The present invention relates to a method and apparatus for sealing an aluminum lid to an aluminum container. More particularly the invention relates to an apparatus comprising a heat sealing head in combination with an annular cup retaining insert having a resilient sealing insert ring affixed thereto whereby the container and lid are compressed together to form a gas tight seal there between by the cooperative compressing action of the insert and sealing head.

2. Description of the Prior Art

The use and availability of various convenience foods, liquid drugs and other consumables has increased vastly in recent years. Associated with this increase has been a growth in the number and type of containers and packages developed. These range from simple plastic bags to waxed boxes or cartons and from glass containers to metallic enclosures.

In order to prevent spoilage or contamination, it is imperative that the container be inert with respect to the contents and that the closure seal be effective. In addition the container should not breathe or allow gases to pass through the enclosure. It has been found that plastic and metallic containers fulfill these requirements to a degree.

In large scale assembly it is essential to have a rapid and durable filling and sealing apparatus. Plastic containers permit effective sealing of the lid to the container simply by melting and bonding the cover or lid to the upper rim of the container. This melting process permits the flow of plastic to compensate for any variations or irregularities in the lid or rim. However, plastics breathe and therefor do not effectively seal out gas and moisture in the surrounding environment. Metals on the other hand, minimize this breathing thereby effectively isolating the container interior whereby the contents are preserved and extending the shelf-life of the products. This is particularly important in mass production where large quantities are produced and stored, thus permitting efficient production, storage and transportation to consumer outlets. Unfortunately adequate seals between the container and the cover or lid of such metallic containers has been a problem. Since the container is metallic and therefor substantially inflexible; heat sealing head, lid, container and container retaining means irregularities effect the quality of the bond or seal. In many cases lids made of paper or other such material are used to compensate for these irregularities. Unfortunately these lids absorb substantial amounts of heat during the sealing process which reduces the heat sealing efficiency since a greater amount of heat is required to form the seal. In addition, scorching often results which is undersirable from a consumer appearance standpoint. Further, such lids when exposed to changes in moisture and temperature often curl thereby reducing the effective bond between the lid and the container. As a result many producers have resorted to metallic lids as well. In some instances thick metallic lids which melt into a rim or ridge formed in the container are used. Of course, this additional material increases the cost and reduces the speed of the capping operation due to the increased heat and pressure requirements.

Where a thin metallic lid is used the problem of component irregularities still exist. To compensate for the various irregularities some containers use a resilient ring within each lid. This ring is of course an additional expense and in most cases slows down the sealing or capping process.

Even assuming the heat sealing head and container holder insert are initially uniform, each is exposed to the environmental conditions of heat and pressure which over a period of time cause irregularities. Even without wear and heat distortion, non-uniformity of the machine components, irregular thicknesses of the container and/or lid may decrease the effectiveness of the seal.

Thus it can be seen that a need exists for an effective means of rapidly sealing metallic containers to metallic lids with a liquid and gas proof bond using a minimum of material.

SUMMARY OF THE INVENTION

This invention relates to a method and apparatus for closing and sealing metallic containers with metallic lids. More specifically this method and apparatus comprises an annular cup retaining insert having a resilient sealing ring fixedly attached to its upper surface to support the underside of a container rim or lip formed about the upper periphery of the container. The resilient sealing ring has a substantially L-shaped cross-sectional area which in the inverted position is chemically bonded to the retaining insert along the top portion of the insert as well as the interior vertical wall of the insert. The resilient sealing ring may be of neoprene rubber or any similar resilient, heat and wear resistant material. A plurality of insert/ring combinations are mounted within horizontally disposed apertures formed in a conveyor-like platform to hold containers upright and convey these containers from station to station during the filling and sealing process.

A plurality of reciprocating heat sealing heads are located above the platform, each heat sealing head corresponding to a row of inserts. The heat sealing head comprises a reciprocating member having at its lower extreme, an annular horizontally disposed heat sealing face substantially the diameter of the retaining insert. In the sealing position or station the row of heat sealing heads are located immediately above and concentrically aligned with the corresponding row of insert/ring combinations.

When in operation, each row of inserts advances from station to station. After a row of containers is filled, a lid or cover is placed over each container to be sealed. Upon reaching the sealing station, the sealing head and insert/ring combination are aligned along the vertical axis. When in this position the heat sealing head is moved downward by external means causing the heat sealing face to engage the upper surface of the lid. As the heat sealing head continues to travel downward the lid and container lip, supported by the insert/ring combination, are compressed together; by applying heat, from heat sealing head, and pressure to the lid and container lip thereby sealing them.

An important feature of this invention is the resilient sealing ring which compensates for any irregularities in thickness of the container lip and/or lid as well as any irregularities in the components of the apparatus. This is critical since the machine tolerance of insert and heat sealing face are often not adequate to insure a gas tight bond. Further the horizontal planes of heat sealing face and insert may not be exactly parallel causing unequal pressure to be applied about the periphery of the lip and lid.

The extension of the insert ring along the internal vertical wall of the retaining insert prevents any cracks or irregularities formed therein from trapping any impurities thus reducing any possibility of contamination of the container contents.

The present invention accordingly comprises the features of construction, combination of elements, and arrangement of parts which will be exemplified in the construction here and after set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar characters refer to similar parts throughout the several views of the drawing.

DETAILED DESCRIPTION

Figure 1:
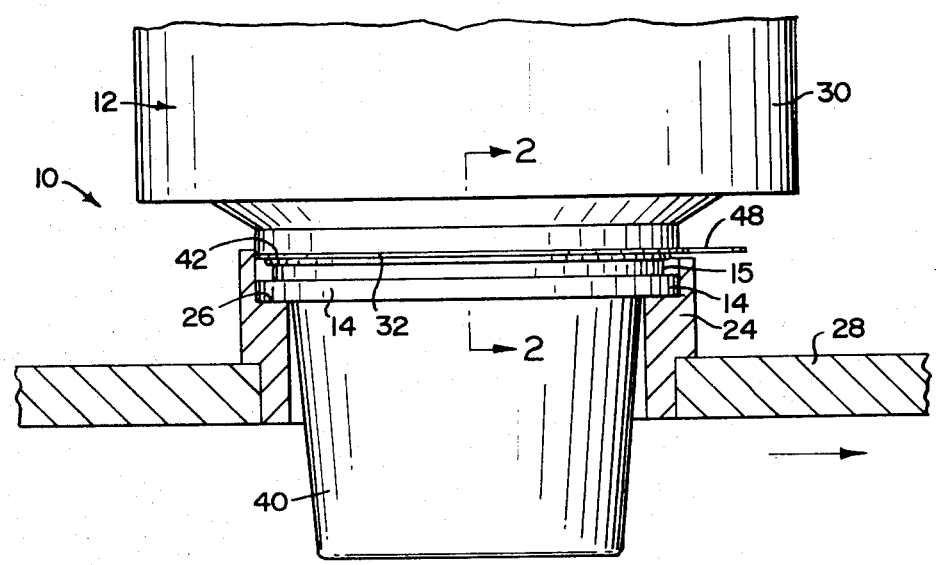
FIG. 1 is a side view of the apparatus in heat sealing position.
Figure 2:
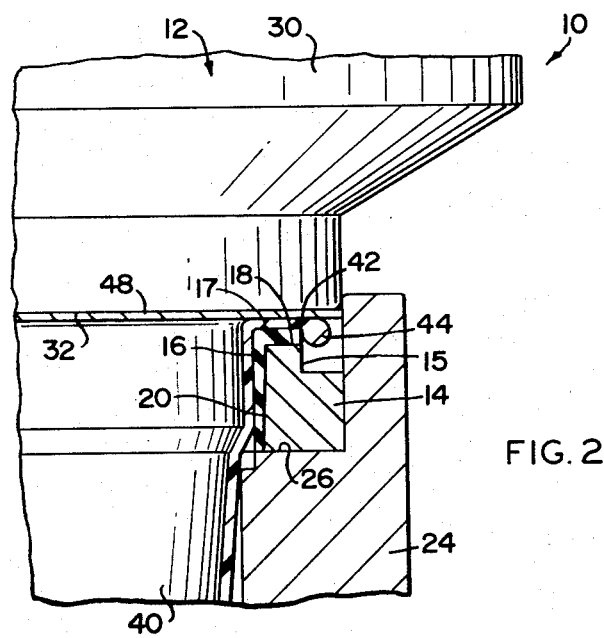
FIG. 2 is a cross-sectional view of the apparatus taken along line 2—2 of FIG. 1.
Figure 3:
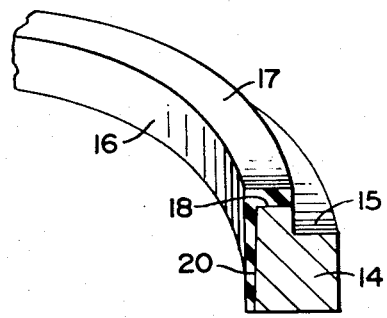
FIG. 3 is a cross-sectional view of the annular retaining insert with resilient sealing ring bonded thereto.
Figure 4:
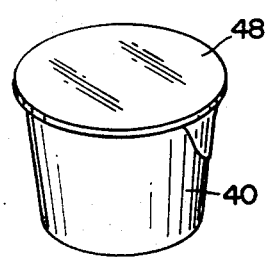
FIG. 4 is a container/lid combination sealed together by the closure device.

As shown in FIG. 1 this invention relates to a method and apparatus, generally indicated at 10, for closing and sealing metallic containers with metallic lids. Apparatus 10 comprises a heat sealing head 12 and an annular cup retaining insert 14. With reference to FIG. 3, it can best be seen that annular cup retaining insert 14 includes a resilient sealing ring 16 having a substantially L-shaped cross-section such that insert 14 and ring 16 are bonded together along the upper horizontal surface 18 and vertical interior surface 20 of the insert 14. Insert 14 further includes cutout portion 15 and its upper outer surface. A plurality of insert/ring combinations are mounted within annular couplers 24 arranged in a series of rows and columns within a conveyor-like platform 28. Annular couplers 24 include a stepped portion with a horizontally disposed ledge 26 upon which the under surface of inserts 14 are seated.

A plurality of reciprocating heat sealing heads 12 are located above the platform 28, each heat sealing head 12 corresponding to a row inserts 14. Each heat sealing head 12 comprises a vertically disposed reciprocating cylindrical body 30 having at its lower extreme a horizontally disposed annular heat sealing face 32 substantially the diameter of the retaining insert 14. The plurality of heat sealing heads 12 are arranged in a row such that when in the sealing position or station, the row of heat sealing heads 12 are located immediately above and concentrically aligned with the corresponding row of insert ring combinations.

In operation cups 40 are placed into inserts 14 where cup lip 42 seats on the upper horizontal surface 17 of the sealing ring 16. Cutout portion 15 is provided to accommodate bead 44 of lip 42. As the cups or containers 42 are filled they are advanced by movement of the platform 28 to a capping station where lid 48 including a heat seal coating on its under surface is placed over the opening. Cups 42 and lids 48 then advance to the sealing station. Upon reaching the sealing station, heat sealing head 12 and insert/ring combination are aligned along the vertical axis, as previously discussed. When in this position the heat sealing head is moved downward by external means (not shown) causing the heat sealing face 32 to engage the upper surface of lid 48. As the heat sealing head 12 continues to travel downward, the lid 48 and container lip 42, supported by the insert/ring combination, are compressed together applying heat from the heat sealing head 12 and pressure to the lid 48 and container lip 42 melting the heat seal coating thereby sealing them together.

The resilient sealing ring 16 performs two unique functions. The resilient nature of this heat, wear resistant ring 16 permits it to compensate for any irregularities in thickness of the container lip 42 and/or lid 48. Irregularities in the components of the apparatus such as unevenness in the heat sealing face 32 or the upper surface of insert ring 18 also may decrease the effectiveness of the seal. Further the horizontal planes of the heat sealing face 32 and insert/ring combination may not be exactly parallel causing unequal pressure to be applied about the periphery of the lip 42 and lid 48 reducing the bond therebetween. The ring 16 similarly compensates these latter deficiencies. Another important feature of the insert ring 16 is its vertical extension along the internal vertical wall 20 of retaining insert 14. This prevents any cracks or irregularities in the surface thereof from trapping any impurities or products thus reducing any possibility of contamination of container contents.

It should be obvious that by changing couplers 24 and insert rings 14 cups of various sizes and shapes may be filled by merely changing the components.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An apparatus for closing and sealing containers comprising a reciprocating heat sealing head and a cup retaining insert, said cup retaining insert including a resilient sealing ring bonded to its upper horizontally disposed annular surface and extending downwardly along the interior wall of said cup retaining insert and support means to support a cup, said heat sealing head and said cup retaining insert disposed in spaced, correspondingly mating relation to one another, whereby a rim of the cup and a lid therefor are sealed together under the heat and pressure of said heat sealing head and said cup retaining insert when oriented in mating relation to one another.

2. The apparatus of claim 1 wherein said reciprocating heat sealing head includes a vertically disposed body having a lower extreme terminating in a horizontally disposed circular heat sealing face.

3. The apparatus of claim 2 wherein said cup retaining insert comprises a horizontally disposed annular ring having a diameter substantially equal to the diameter of said heat sealing face and parallel thereto, said heat sealing face and said annular cup retaining insert being concentrically aligned during the sealing process.

4. The apparatus of claim 3 wherein said cup retaining insert further includes a resilient sealing ring having a substantially L-shaped cross-sectional area bonded to its upper horizontally disposed annular surface and extending downwardly along the interior wall of said cup retaining insert, said resilient sealing ring configured to define an upper surface disposed in supporting relation to a rim of the cup, whereby the surface of said resilient sealing ring is compressed by the forces exerted between said annular cup retaining insert and said reciprocating heat sealing head.

5. The apparatus of claim 3 wherein said cup retaining insert further includes a stepped surface about its outer circumference to retain a beaded rim.

* * * * *